Feb. 13, 1962    N. GUEDON    3,021,036
GREASE GUN
Filed Oct. 22, 1958
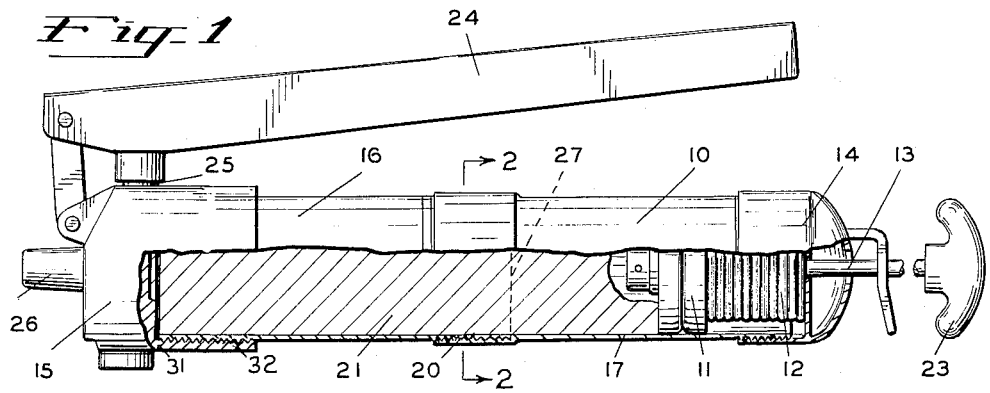
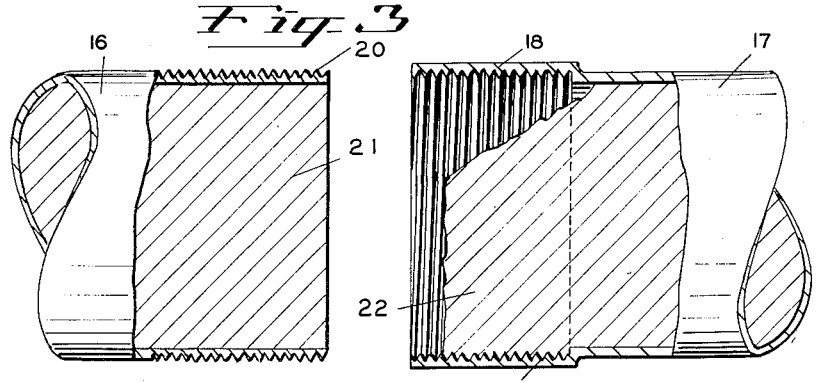
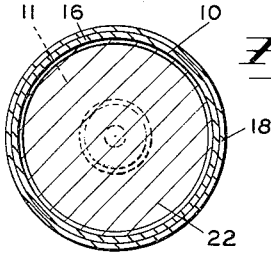
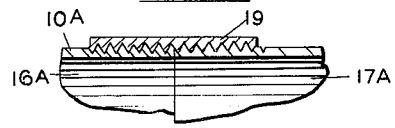
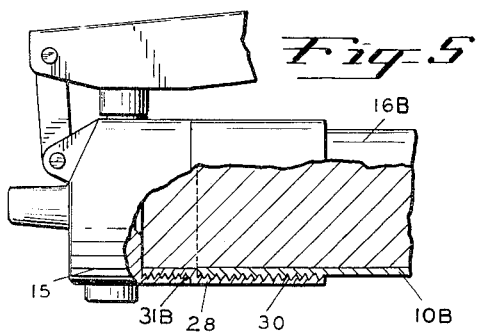
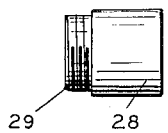
INVENTOR.
NOEL GUEDON
BY
*Kimmel & Crowell*
ATTORNEYS

3,021,036
GREASE GUN
Noel Guedon, Rte. 2, Box 316, Newberg, Oreg.
Filed Oct. 22, 1958, Ser. No. 768,988
1 Claim. (Cl. 222—256)

The present invention relates to a grease gun and particularly a hand pressure grease gun used for filling alemite grease fittings and the like.

The primary object of this invention is to provide a grease gun having means therein for preventing air pockets being created in the grease while filling the gun with grease.

A further object of the invention is to provide a grease cylinder adapted for use with existing grease guns. In order to carry out this object, the cylinder of the gun is demountable so that the gun can be filled with grease by a paddle, or the like, without creating air pockets. On eliminating air pockets the gun can measure out a definite amount of grease to each fitting which now is not possible when air pockets exist in the grease within the supply cylinder.

A still further object of the invention is to provide means of applying positive pressure to the cylinder containing grease while filling the same to further assist in dispelling the air therefrom.

Other objects and advantages will become apparent in the following specification when considered in the light of the attached drawings, in which:

FIGURE 1 is a side elevational view of the invention shown partially broken away and in section for convenience of illustration;

FIGURE 2 is an enlarged transverse sectional view, taken on line 2—2 of FIGURE 1, looking in the direction of the arrows;

FIGURE 3 is an enlarged fragmentary side view partially broken away and in section, shown in position for assembly;

FIGURE 4 is a fragmentary sectional view of a modified connector structure;

FIGURE 5 is a fragmentary side view of a modified form shown partially broken away and in section for convenience of illustration; and FIGURE 6 is a side elevational view of the adapter of FIGURE 5 removed from the gun.

Referring now to the drawings in detail wherein like reference characters indicate like parts throughout the several figures, the reference character G indicates generally a grease gun constructed in accordance with the invention.

The grease gun G includes a grease cylinder 10, having a grease compression piston 11, a compression spring 12, operating rod 13 and retaining cap 14 associated therewith.

A pressure pump mechanism 15 of conventional construction is threaded to the end of the grease cylinder 10, opposite the cap 14. A relatively deep threaded cap 31 forms part of the pump mechanism 15 for threaded engagement with the cylinder 10. The grease cylinder 10 has two separate sections 16 and 17. The section 17 is provided with an integral relatively long internally threaded coupler 18. The coupler 18 is relatively long, such as one half, or more, of the internal diameter of the cylinder 10, so that the threaded end 20 of the section 16 can be threaded a considerable distance therein. The threaded end 20 and the coupler 18 meet with a smooth interior joint, providing a continuous internal cylindrical surface along which the piston 11 can slide with no interference. The object of which will be more apparent later on.

In order to load the grease gun G with grease, the sections 16 and 17 are separated. The grease 21 is forced into the section 16 by a suitable implement, as for instance a paddle (not shown), and forced towards the pressure mechanism 15. Due to the relatively short length of the section 16 little or no air will be trapped in the grease 21 when being forced in to the section 16.

The section 17 is loaded with grease 22 by pulling back on the handle 23, which pulls the piston 11 to the position shown in FIGURE 1. The grease 22 is then forced into the cylinder 17 by means of a hard paddle (not shown).

Sufficient grease 22 is forced into the section 17 to partially or fully fill the coupler 18, as best illustrated in FIGURE 3. Then as the sections 16 and 17 are threaded together, compression is applied to the grease 21 and 22 within the cylinder 10, expelling all air from the cylinder 10 so that when the operating handle 24 is operated, the pressure piston 25 of the pumping unit 15 will immediately force grease out of the fitting 26 into the receiving fitting (not shown) without air being contained therein.

The quantity of grease packed into the sections 16 and 17 will be such that when screwing the sections 16 and 17 together all air will be expelled from the cylinder 10 prior to the engagement of the end 27 of the section 16 with the bottom of the coupler 18, as best illustrated in FIGURE 1.

In conventional grease guns having a single cylinder, the length thereof is such that it is practically impossible to expel air from the grease when filling the cylinder. By making the cylinder into two sections and disconnecting them in the center midway their length, as described above, the grease can be easily placed in the sections by a paddle, and when the sections are threaded together a considerable amount of pressure is exerted on the grease, expelling air therefrom.

Air may also be expelled from the grease when loading the gun by filling the cap 31 with grease, as well as filling the cylinder 10 and when the cylinder 10 is threaded into the threads 32 of the cap 31, the grease will be compressed by the movement of the cylinder 10 towards the head of the pressure pump mechanism 15 within the cap 31.

Referring to the modification illustrated in FIGURE 4, the cylinder 10a comprises a pair of sections 16a, 17a which are joined together by an internally threaded coupler 19. The sections 16a and 17a are operated in the same manner as the sections 16 and 17 of the preferred form of the invention.

Referring to FIGURES 5 and 6, another modification of the invention is illustrated wherein an extension and compression ring 28 is adapted to a standard grease gun pressure pump 15b. The ring 28 is threaded into the pressure pump mechanism 15b with its external threads 29 being threaded into the cap portion 31b of the pressure pump mechanism.

The extension and compression ring 28 is interthreaded with a relatively long thread 30 into which the section 16b of the cylinder 10b is threaded. The extension and compression ring 28 will hold an excessive amount of grease so that when the cylinder 16b is threaded therein, the grease will be compressed together with the grease within the cylinder 16b, expelling the air pockets therefrom.

In the modification illustrated in FIGURES 5 and 6, air is expelled in the same manner as described in the preferred form of the invention.

In the operation of grease guns, the fittings to be charged require a certain predetermined number of pumped strokes. When all air has been discharged from this gun, the required amount of grease can be very accurately applied to the receiving device, but where air is contained within the gun the amount of grease passing into the receiving fitting is not controlled, therefore with this new and improved grease gun a more efficient and reliable greasing operation is possible.

Having thus described the preferred embodiments of the invention, it should be understood that numerous structural modifications and adaptations may be resorted to without departing from the scope of the appended claims.

What is claimed is:

A hand grease gun comprising a grease pressure pump, an internally threaded cylindrical cap integrally formed on said grease pump and extending outwardly therefrom, a first single walled cylindrical section externally threaded at its opposite ends with one end thereof threaded into said cap, a second single walled cylindrical section including an internally threaded coupler integrally formed on the end thereof threadedly engaged with said first cylindrical section and arranged in axially aligned relation therewith providing a smooth interior joint, said first and second cylindrical sections being of substantially the same length and of the same diameter, a closure for said second cylindrical section, a piston of a diameter substantially equal to the internal diameter of said cylindrical sections in said second section, and an operating handle for said piston extending outwardly through said closure, the threaded coupling for securing said first and second sections together in end to end relation being of a length equal to at least one-half the internal diameter of said cylinder in order to compress grease contained therein to expel air therefrom when the sections are assembled.

References Cited in the file of this patent
UNITED STATES PATENTS

| | | |
|---|---|---|
| 1,623,690 | Little | Apr. 5, 1927 |
| 1,655,436 | Piquerez | Jan. 10, 1928 |
| 1,751,114 | Walstrom | Mar. 18, 1930 |
| 2,858,962 | Lucien | Nov. 4, 1958 |